United States Patent [19]
Oh

[11] Patent Number: 5,937,060
[45] Date of Patent: Aug. 10, 1999

[54] RESIDUAL ECHO SUPPRESSION

[75] Inventor: Stephen S. Oh, Richardson, Tex.

[73] Assignee: Texas Instruments Incorporated, Dallas, Tex.

[21] Appl. No.: 08/797,801

[22] Filed: Feb. 7, 1997

Related U.S. Application Data

[60] Provisional application No. 60/011,427, Feb. 9, 1996.
[51] Int. Cl.⁶ .............................. H04M 1/00; H04M 9/08; H04B 15/00
[52] U.S. Cl. .......................... 379/406; 379/410; 379/411; 370/286; 381/94.3
[58] Field of Search .................................. 379/406, 410, 379/411; 370/286; 381/94.3

[56] References Cited

U.S. PATENT DOCUMENTS

| | | | |
|---|---|---|---|
| 5,157,653 | 10/1992 | Genter | 370/32.1 |
| 5,390,250 | 2/1995 | Janse et al. | 379/410 |
| 5,633,936 | 5/1997 | Oh | 381/66 |

*Primary Examiner*—N. Le
*Assistant Examiner*—Shih-Wen Hsieh
*Attorney, Agent, or Firm*—Wade James Brady, III; Warren L. Franz; Richard L. Donaldson

[57] ABSTRACT

A residual echo suppression system suppresses the remaining echo signal not cancelled by an echo canceller. The residual echo suppression system replaces the remaining echo signal by reshaping the spectrum of the signal so that the spectrum shape matches the background noise spectrum. The resultant system is useful in hands-free telephones and especially in hands-free cellular telephones for use in automobiles.

21 Claims, 7 Drawing Sheets

RESIDUAL ECHO SUPPRESSION

This application claims benefit under 35 USC §119(e)(1) of copending provisional application 60/011,427 filed Feb. 9, 1996.

BACKGROUND OF THE INVENTION

In a full-duplex hands-free telephone or speaker phone, sound uttered by a first person calling to the speaker phone and emanating from the speaker are picked up by the microphone which is intended to pick up sounds uttered by the second person who is the user of the speaker phone. Careful design of the hands-free telephone can prevent positive feedback which results in howling. A second form of feedback can be present in which the first speaker's words are transmitted back to him or her delayed in time at a reduced magnitude and often distorted. This echo of one's own words is very distracting to most users and is normally controlled by the use of an acoustic echo canceller circuit. If the hands-free telephone is a cellular telephone in an automobile, adaptive noise suppression is required because the signal-to-noise ratio is low and the characteristic of the noise varies with time.

In known hands-free digital cellular telephones, the acoustic echo cancellation and noise suppression problems have been addressed as separate problems. Therefore, applying these solutions together may result in an inefficient system. For example, the full-band LMS algorithm disclosed in Sondhi, M. M. and Kellerman, W., Adaptive Echo Cancellation for Speech Signals, Chapter 11 from *Advanced in Speech Signal Processing,* Ed. by S. Furui and M. M. Sondhi, Marcel Dekker, 1991, can be used to provide an effective and straightforward solution to echo cancellation. Recently, researchers have been using a sub-band acoustic echo canceller because this requires less computational complexity and provides faster convergence to the filter coefficients that produce optimum echo cancellation. The noise suppression algorithm is commonly based upon the spectral subtraction method. In the spectral subtraction method, for the noise-only period, the noise spectrum is estimated using Fast Fourier Transform (FFT) or band pass filter banks. When the speech signal with noise comes in, the noise spectrum estimate is subtracted from the noise signal spectrum. The spectral subtraction method performs well for enhancing the signal-to-noise ratio but may create an artifact called "musical noise". A system which utilizes a smoothed spectrum for spectral subtraction in order to avoid the production of musical noise is shown in the U.S. patent application Ser. No. 08/426,746 filed Apr. 19, 1995 by Allen V. McCree and assigned to Texas Instruments Incorporated, which is incorporated herein by reference.

Figure 1:
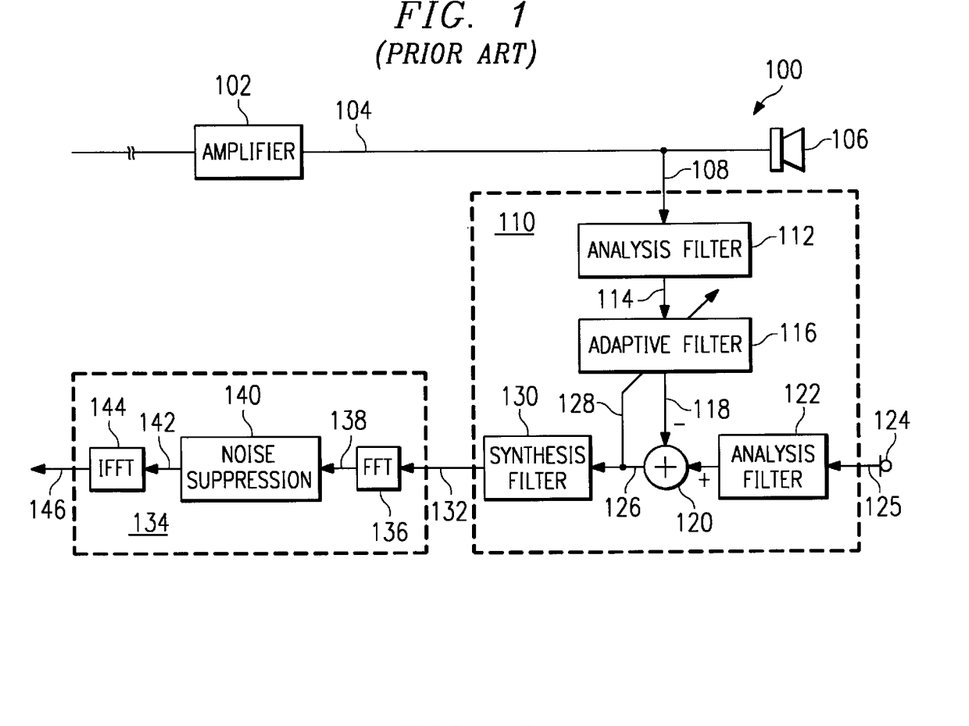
FIG. 1 is a block diagram of an acoustic echo cancellation and noise suppression system known in the prior art.

FIG. 1 shows a prior art system in which the two algorithms, one for the acoustic echo cancellation and one for noise suppression are applied independent of each other. In the system shown in FIG. 1, acoustic echo cancellation is provided by block 110 and noise suppression is provided by block 134. The output signal on line 104 used to drive speaker 106 is provided by amplifier 102 from well-known circuitry inside the hands-free telephone (not shown). The output signal on line 104 is also provided by line 108 to an analysis filter 112 which generates a sub-band signal on line 114 at the output of the analysis filter. The sub-band signal on line 114 is provided to adaptive filter 116. The output of adaptive filter 116 on line 118 is provided to summing amplifier 120 which also receives an input from analysis filter 122. Analysis filter 122 provides a sub-band signal from the input of microphone 124 which is the acoustic sounds emanating from the user also known as "near-end speech". The output of summation amplifier 120 on line 126 is provided to synthesis filter 130 which generates a full-band signal on line 132 and also via line 128 to the adaptive filter 116 to adjust the coefficients utilized by the filter 116. The coefficients of the adaptive filter 116 are adjusted in order to provide acoustic echo cancellation, as is well known in the art. Block 110 shows a sub-band acoustic echo cancellation system. If the system were to be implemented in the full-band domain, analysis filters 112 and 122 and synthesis filter 130 would be omitted.

The full-band reduced echo signal on line 132 is input to noise suppression circuit 134 at FFT generator 136. The output of FFT generator on line 138 is input to noise suppression circuit 140 which performs the spectral subtraction. The output of the spectral subtraction circuit on line 142 is fed into Inverse Fast Fourier Transform (IFFT) circuit 144 which produces the full-band signal on line 146 as an output of the acoustic echo cancellation and noise suppression circuit 100.

The echo cancellation algorithm may cancel the echo signal by 25 dB, for example, but the remaining echo is still able to be heard. Therefore, a residual echo suppression circuit may be used to repress the remaining echo signal more completely. However, prior art residual echo suppression circuits attenuate the signal when a detection circuit detects a remaining echo signal. This method, however, may produce the so-called "switching" effect, when the signal to noise ratio is low. The switching effect is caused by the antenuator suppressing the noise components all through the period when the residual echo signal should be suppressed, which in turn creates abrupt changes in the background noise. Accordingly, there is a need for echo suppression without creating the switching effect.

SUMMARY OF THE INVENTION

It is a general object of the present invention to provide a method and apparatus for suppressing residual echo.

Another object of the invention is to provide a method and apparatus for residual echo suppression in a sub-band domain.

A further object of the invention is to provide a method and apparatus for residual echo suppression in a hands-free telephone.

Yet another object of the invention is to provide a method and apparatus for residual echo suppression for a hands-free cellular telephone for an automobile.

These and other objects, advantages and features are achieved by a method for further reducing echo in a hands-free telephone which comprises a loudspeaker coupled to an output source which generates a corresponding acoustic signal and a microphone for generating an input signal and an acoustic echo cancellation means for generating a reduced-echo signal. An echo canceller energy ratio (ECER) is determined as an energy ratio between an output of the acoustic echo cancellation means and the output signal. ECER is compared to a predetermined threshold level. Spectrum reshaping of the reduced-echo signal is performed if ECER exceeds said predetermined threshold level.

Another aspect of the invention includes a hands-free telephone which comprises a loudspeaker coupled to an output source for generating a corresponding acoustic signal and a microphone for generating an input signal and an acoustic echo cancellation means for generating a reduced-echo signal. Apparatus for further reducing echo comprises means for determining an echo canceller energy ratio (ECER) as an energy ratio between an output of the acoustic echo cancellation means and the output signal. Means compares ECER to a predetermined threshold level. Means performs spectrum reshaping of the reduced-echo signal if ECER exceeds the predetermined threshold level.

A further aspect of the invention comprises a method for further reducing echo in a hands-free telephone which comprises a loudspeaker coupled to an output source for generating a corresponding acoustic signal and a microphone for generating an input signal and an acoustic echo cancellation means for generating a reduced-echo signal. An echo canceller energy ratio (ECER) is determined as an energy ratio between an output of the acoustic echo cancellation means and the output signal. ECER is compared to a predetermined threshold level. Spectrum reshaping is performed if the reduced-echo signal of ECER exceeds the predetermined threshold level. Reshaping comprises computing an output signal $r_i(t)$ as $$r_i(t) = s_i(t) * NS_i * \frac{\lambda(t)}{\varphi_i(t)}$$

where $s_i(t)$ is the output of the noise suppression circuit, $NS_i$ is the noise spectrum estimate, $$\lambda(t) = \frac{1}{N} \frac{1}{M} \sum_{k=1}^{N} \sum_{j=1}^{M} |s_j(t-k)|^2$$

where M is the number of bins and N is the total number of data points in a frame; and $$\Psi_i(t) = (1-\mu)\Psi_i(t-1) + \mu|s_i(t)|^2$$

where $\mu \ll 1$.

BRIEF DESCRIPTION OF THE DRAWINGS

FIG. 11 shows a spectrogram of four signals.

DETAILED DESCRIPTION

In the present invention, frequency domain processing is viewed as a special case of sub-band domain processing to produce a more efficient system in which both acoustic echo cancellation and noise suppression operations are performed in the same domain without going through a synthesis filter and Fast Fourier Transformation. Reducing the operations of synthesis filtering and Fast Fourier Transformation provides savings in processing power and computational complexity. Thus, the system proposed herein can require as little as seven MIPS of processing power, thus reducing the processing power required by two-thirds to three-quarters. The acoustic echo canceller and sub-band domain noise suppression system is shown generally as 200 in FIG. 2. Like elements have similar reference numerals to those illustrated in FIG. 1. Thus, the amplifier, speaker and microphone can be identical to that utilized in the diagram shown in FIG. 1. The acoustic echo canceller block 210 is essentially the same as the acoustic block 110 shown in FIG. 1, except that the synthesis filter 130 for converting the sub-band signal to a full-band signal is omitted. A synthesis filter 234 is instead applied to the output 232 of the noise suppression circuit 230 to provide full-band signal z(t) on line 236.

Figure 2:
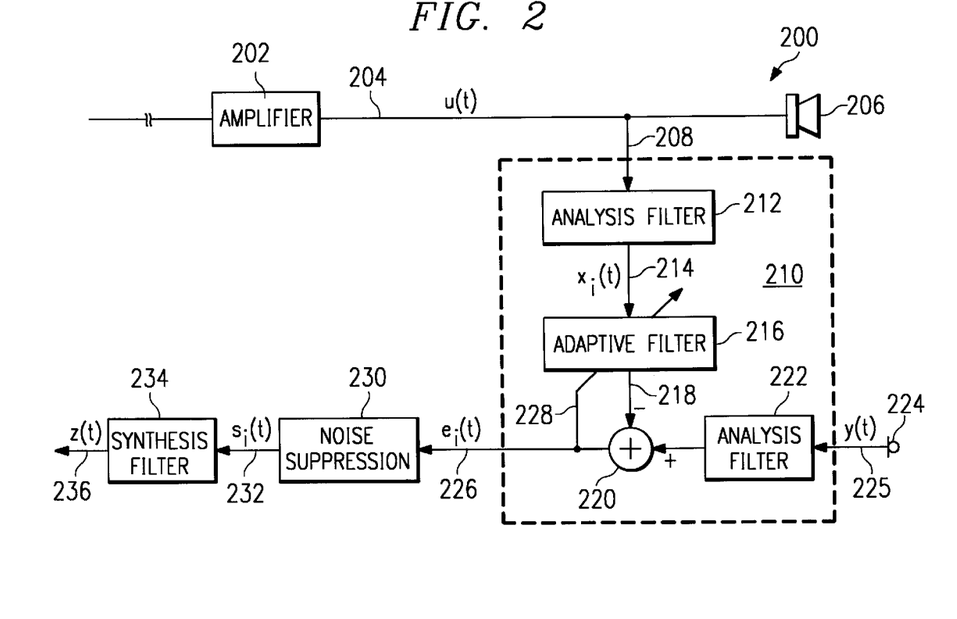
FIG. 2 is a block diagram of an acoustic echo cancellation and noise suppression system in accordance with one embodiment of the present invention.
Figures 3, 4:
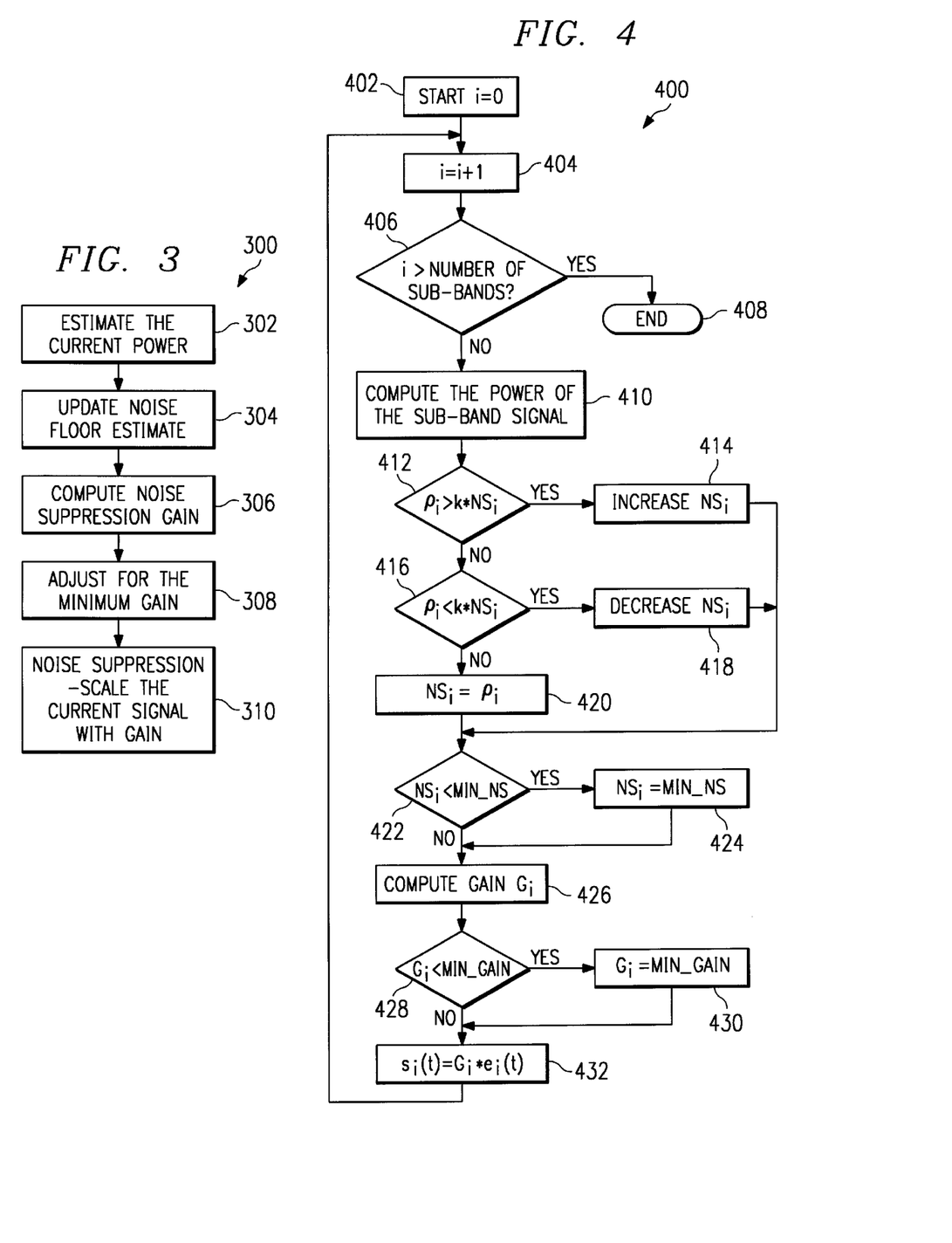
FIG. 3 is a flow diagram of the event sequences implemented by the noise suppression circuit of FIG. 2.
FIG. 4 is a more detailed flow diagram of the event sequences illustrated in FIG. 3.

The noise suppression circuit 230 receives the output of the acoustic echo canceller $e_i(t)$ on line 226 and performs the algorithm 300 shown in FIG. 3. In a preferred embodiment, eight sub-bands are utilized and smoothing operation is performed in the time domain using an IIR (Infinite Impulse Response) filter, a first order loop filter, on a power spectrum estimate for each sub-band to provide the time-domain smoothing without introducing system latency. An estimate of the power spectrum at the i-th sub-band is performed in block 302 using the equation:

$$\rho_i(t) = (1-\mu)\cdot\rho_i(t-1) + \mu|Xi(t)|^2 \qquad \text{(Equation 1)}$$

where $\rho_i(t)$ is the estimate of the power spectrum at the $i^{th}$ sub-band, $|Xi(t)|^2$ is the current instantaneous power at the $i^{th}$ sub-band and $\mu \ll 1$.

This provides an exponentially decreasing contribution for each of the previous time samples. For example:

$$\rho_i(10) = (1-\mu)\rho_i(9) + \mu|Xi(10)|^2$$
$$= (1-\mu)[(1-\mu)\rho_i(8) + \mu|Xi(9)|^2] + \mu|Xi(10)|^2$$
$$= (1-\mu)^2\rho_i(8) + \mu(1-\mu)|Xi(9)|^2 + \mu|Xi(10)|^2$$
$$= (1-\mu)^{10}\rho_i(0) + (\mu(1-\mu))^9|Xi(1)|^2 +$$
$$(\mu(1-\mu))^8|Xi(2)|^2 \ldots + \mu(1-\mu)|Xi(9)|^2 + \mu|Xi(10)|^2$$

for $\mu = 0.1$ $\rho_i(0) = 0$ $$\rho_i(10) = 0.1|Xi(10)|^2 + 0.09|Xi(9)|^2 + 0.08|Xi(8)|^2 \ldots + 0$$

The algorithm then proceeds at block 304 where the noise spectrum estimate is updated. In block 306 this information is utilized to complete the noise suppression gain using the equation wherein $$G_i = \left(1 - \frac{NS_i}{k\rho_i}\right)^{\frac{1}{2}} \quad \text{(Equation 2)}$$

where k is a predetermined value to reduce the fluctuation of gain due to the power spectrum estimate and $NS_i$ is the noise spectrum estimate for the $i^{th}$ sub-band. The gain is then compared with the minimum gain and if it is less than the minimum gain, it is made equal to the minimum gain in block 308. It has been determined that if the noise signal is suppressed too much this results in an audible artifact in the signal. Therefore, a minimum value is assigned to the gain which in effect clamps the noise suppression to avoid this audible artifact. The algorithm then proceeds to block 310 in which the output signal $s_i(t)$ is equal to the computed gain multiplied by the input signal $e_i(t)$.

FIG. 4 shows a more detailed flow chart of the algorithm of FIG. 3. The algorithm starts in block 402 by initializing the sub-band i to 0 and then proceeds to block 404 where the sub-band is incremented by 1. Control then passes to block 406 where the number of sub-bands is compared with the number of sub-bands utilized for the noise suppression operation, in this embodiment 8 sub-bands. Increasing the number of sub-bands reduces the computing power required, if the number of sub-bands is within reason. For example, 32 sub-bands can be used. A disadvantage of increasing the number of sub-bands is the requirement for more memory. Eight sub-bands have been chosen here as a reasonable compromise. If the number of sub-bands has been exceeded the algorithm terminates at block 408. Otherwise, the algorithm passes control to block 410 in which the updated power spectrum estimate ρ of the current sub-band signal is computed utilizing equation 1. Control then passes to block 412 in which the power $\rho_i$ is compared against the constant k times the noise spectrum estimate $NS_i$ for the i-th sub-band. If it exceeds the noise spectrum estimate, then the noise spectrum estimate is increased. If not, control passes to block 416 in which the power of $\rho_i$ is compared to see if it is less than k times $NS_i$. If it is, $NS_i$ is decreased. If it is not, control passes to block 420 in which $NS_i$ is set equal to $\rho_i$. Control from blocks 414, 418 and 420 proceeds to block 422 in which $NS_i$ is compared to see if it is less than the minimum noise spectrum estimate. If it is, then $NS_i$ is set equal to the minimum of the noise spectrum estimate in block 424. The output of block 424 or the "no" output of block 422 passes control to block 426 in which the gain $G_i$ is computed using equation 2. Control passes to block 428 in which the gain $G_i$ is compared to see if it is less than the minimum gain. If it is less than the minimum gain, it is set equal to the minimum gain in block 430. The output of block 430 or the "no" output of block 428 passes to control to block 432 in which the output $s_i(t)$ is set equal to the computed gain $G_i$ times the input signal $e_i(t)$. Control then passes to block 404 where the sub-band is incremented and the process repeated until all sub-bands have been completed and the process terminates at block 408.

Figure 5:
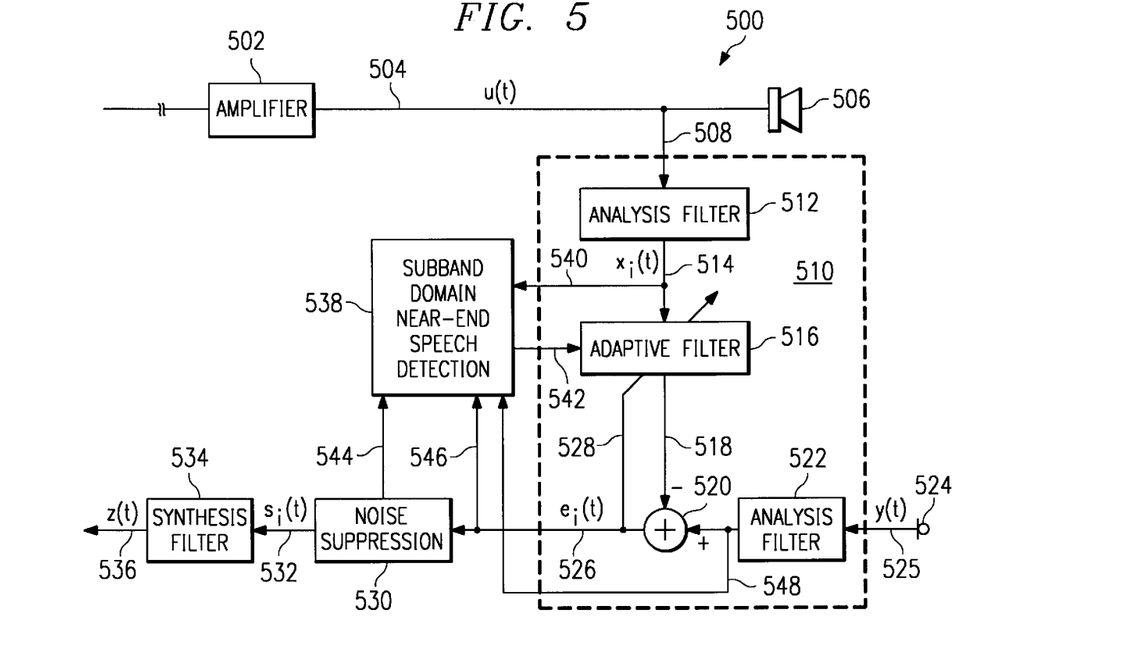
FIG. 5 is a block diagram of an acoustic echo cancellation and noise suppression system which includes sub-band domain near-end speech detection.

FIG. 5 shows a further embodiment of the present invention generally shown as 500 in which near-end speech is detected in the sub-band domain. Near-end speech is speech from the local location of the hands-free telephone, that is, speech from the user of the telephone y(t) as compared with speech from the person from the other end of the telephone line or telephone link u(t). Once near-end speech is detected, the filter coefficients for the adaptive filter 516 are "frozen" in order to prevent the adaptive filter from becoming unstable. A fundamental assumption in acoustic echo cancellation techniques is the absence of near-end speech. Accordingly, when near-end speech is detected, updating of the adaptive filter coefficients is inhibited by logic circuits, for example, to prevent instability. The circuit in FIG. 5 is identical to that of FIG. 2 with the exception of the addition of block 538 which is the sub-band domain near-end speech detection circuit. The circuit 538 receives the sub-band signal $x_i(t)$ that is output from analysis filter 512 as well as the sub-band signal $e_i(t)$ which is the output of acoustic echo canceller block 510. Also received as input is an output of noise suppression circuit 530 on line 544 and the sub-band output of analysis filter 522 on line 548. A control line 542 sends a control signal to the adaptive filter 516 the "freeze" to coefficients thereof once near-end speech is detected.

Figure 6:
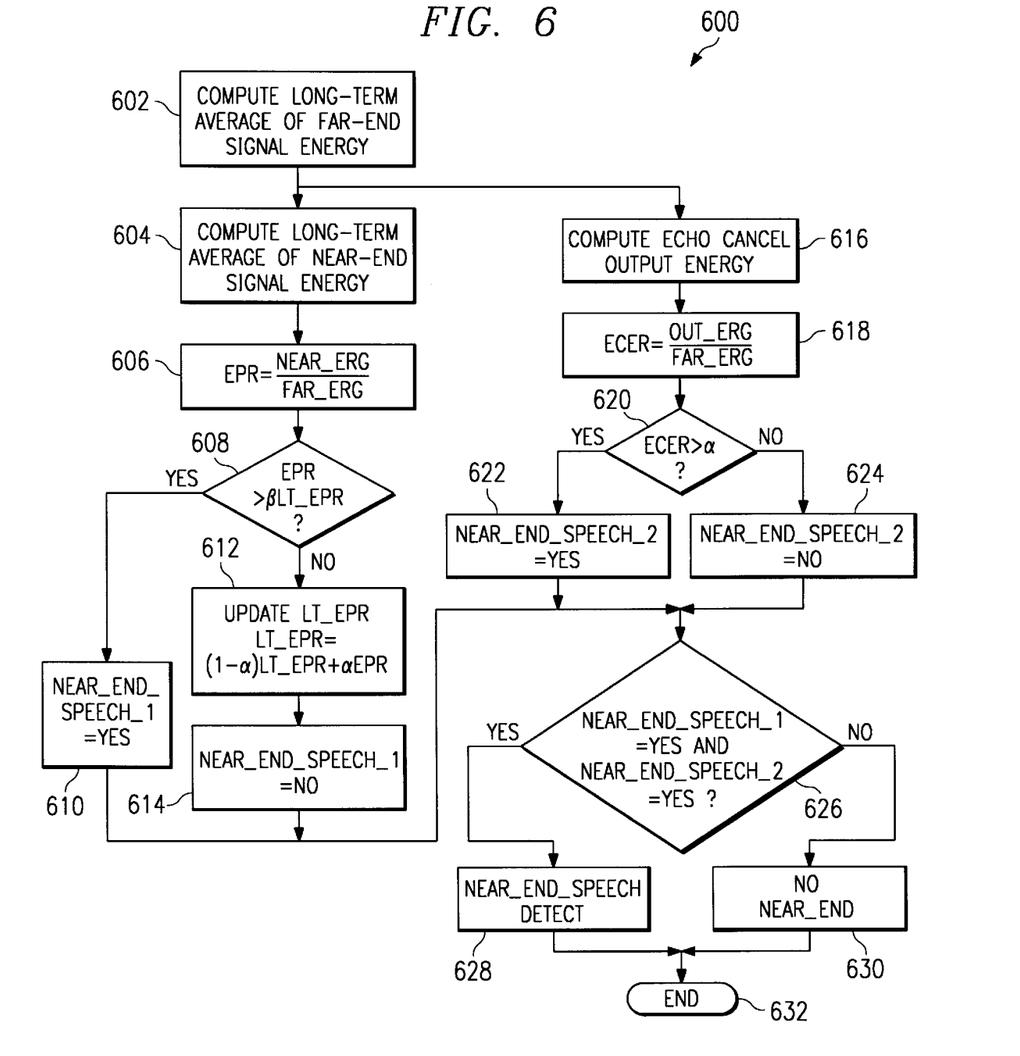
FIG. 6 is flow diagram of the event sequences implemented by the sub-band domain near-end speech detection of the embodiment of FIG. 5.

The circuit 538 implements the algorithm 600 shown in FIG. 6. An adaptive algorithm is used because the targeted environment is adverse (inside an automobile) and time varying. The algorithm uses two measures for detecting near-end speech, the echo path energy ratio and the echo canceller energy ratio. The term "echo path energy ratio" is defined as the energy ratio between the near-end speech signal, y(t), and the far-end speech signal, u(t), shown in FIG. 5. It has been determined that the noise components inside a car for highway driving are concentrated below 500 Hz, while speech signals are spread over entire frequency region. Thus, the echo path energy ratio can be used for detecting the near-end speech regardless of the noise condition if the ratio is computed based on frequency components beyond 500 Hz. This can be easily accomplished in the sub-band domain by selecting higher frequency bins. The term "echo canceller energy ratio" is defined as the energy ratio between the acoustic echo cancellation-noise suppression output $s_i(t)$ and the far-end speech signal u(t). The near-end speech detection algorithm tracks the echo path energy ratio by taking a long-term average and detects when the energy fluctuation is too large. The rationale behind this is that the energy of a human speech signal fluctuates much more quickly compared to any noise changes. For the echo canceller energy ratio, a fixed threshold value is used to detect the near-end speech signal. When both the acoustic echo canceller and noise suppression circuits work properly, the energy of s(t) should be less than the energy of u(t). Otherwise, either echo is not cancelled or noise is not suppressed enough. The fixed threshold value is determined empirically.

The algorithm 600 starts with block 602 in which the long-term average energy for the far-end signal u(t) is computed. Control then passes to block 604 in which the long-term average energy of the near-end signal y(t) is computed. Control passes to block 606 in which the echo path energy ratio (EPR) is determined as the ratio between the near-end speech signal to the far-end speech signal. Control then passes to block 608 in which the EPR is compared to see if it is greater than β LT_EPR. β is an empirically derived constant and LT_EPR is the long-term average for EPR which is computed in block 612. For the first pass, LT_EPR is set equal to EPR from block 606. If EPR is greater than βLT_EPR, then the near-end speech 1 signal is given a Boolean value of "yes" in block 610. If not, control passes to block 612 in which LT_EPR is updated. Control then passes to block 614 which the near-end speech 1 is assigned a Boolean value of "no". Control from blocks 610 and 614 passes through the input decision block 626. Control from block 602 also passes to block 616. In block 616 the echo cancel output energy is computed. Control passes to block 618 in which the echo canceller energy ratio (ECER) is determined as the ratio between the output of the acoustic energy cancellation and noise suppression circuit s(t) to the long-term average for the far-end signal u(t) computed in block 602. Control then passes to block 620 in which ECER is compared to see if it is greater than γ where γ is an empirically determined threshold. If ECER exceeds γ, control then passes to block 622 in which the near-end speech 2 signal is given the Boolean value of "yes". If not, control passes to block 624 in which the near-end speech 2 signal is given the Boolean value of "no". Control then passes to block 626 where it is determined whether or not the near-end speech 1 and the near-end speech 2 signals both have the Boolean value of "yes". If so, near-end speech is detected in block 628 and the program terminates in block 632. If not, then no near-end speech is detected in block 630 and the program terminates in block 632.

Figure 7:
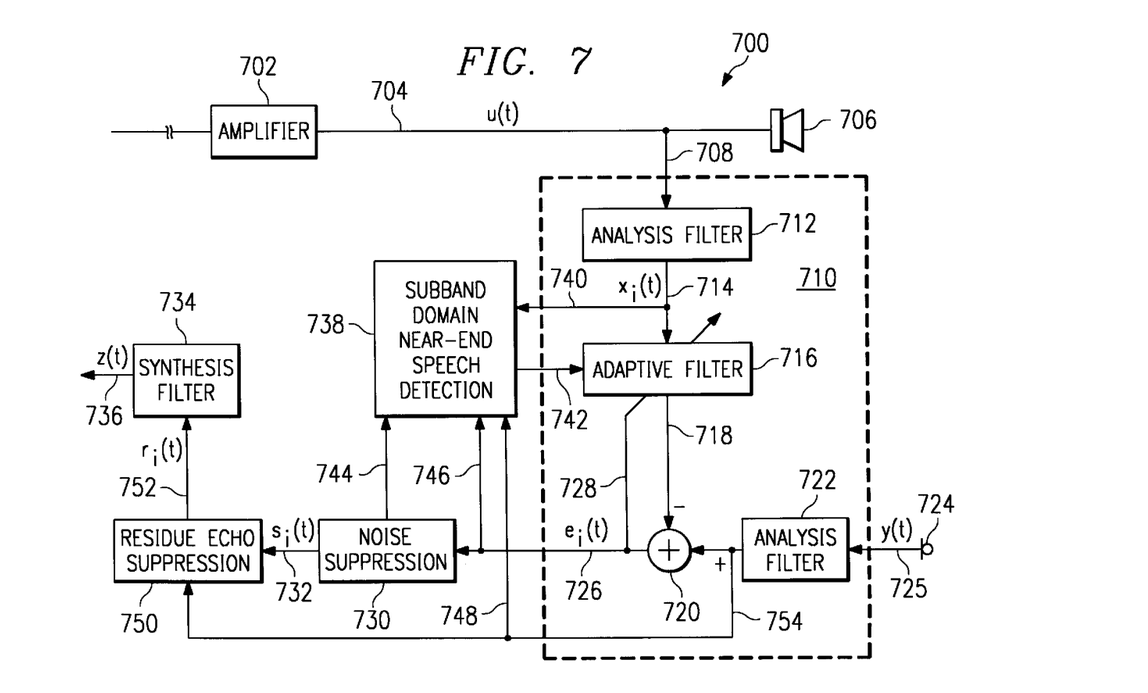
FIG. 7 is a block diagram of an acoustic echo cancellation and noise suppression system having both sub-band domain near-end speech detection and residue echo suppression.

FIG. 7 shows an acoustic echo cancellation and noise suppression circuit 700 which additionally has residual echo suppression embodied in block 750. Circuit 700 is essentially identical to circuit 500 shown in FIG. 5 except for the addition of residue echo suppression circuit 750. Like elements have similar reference numerals to those illustrated in FIG. 5. In FIG. 7, the sub-band domain near-end speech detection circuit block 738 is shown, but is not necessary to practice the residue echo suppression. Residue echo suppression block 750 is connected to receive the signal $s_i(t)$ on line 732 from the output of noise suppression circuit 730. It is also connected to line 748 by line 754 to receive the output of the analysis filter 722 which is the sub-band domain signal from the microphone 724. The output of the echo suppression circuit 750 is fed via line 752 to the synthesis filter 734 to produce a full-band output z(t) on line 736.

The purpose of the residual echo suppression circuit 750 is to reduce the echo signal, if any, remaining after processing by the acoustic echo canceller circuit 210 (shown as 710 in FIG. 7). For example, if the acoustic echo canceller circuit 210 reduces the echo by 25 dB, it may still be heard. When the environment is noisy, however, complete removal of the residual echo signal is not desirable since it produces clicking effects caused by switching too often between suppression and non-suppression modes. This is caused by the alternator circuit suppressing the noise components over the period when the residual echo signal should be suppressed, which creates abrupt changes in background noise. Therefore, the so-called "comfort noise" is generated to reduce the clicking effects. In order to avoid suppressing near-end speech, the residual echo suppression is inactive during the presence of near-end speech. The near-end speech detector should be allowed to false alarm by claiming the presence of near-end speech when it is absent in order to reduce the potential for near-end speech suppression. The residual echo suppression algorithm uses the echo canceller energy ratio (ECER) which was described above, to detect when to suppress the signal. A fixed threshold value is utilized for detection, similar to that utilized for the near-end speech detection discussed above. For example, when there is 10 dB cancellation, the ECER value should be less than about 0.3. Therefore, if ECER is less than 0.3, the residual signal is suppressed. It should be noted that the threshold value utilized here is different from that utilized in the near-end speech detection circuit.

Figure 8:
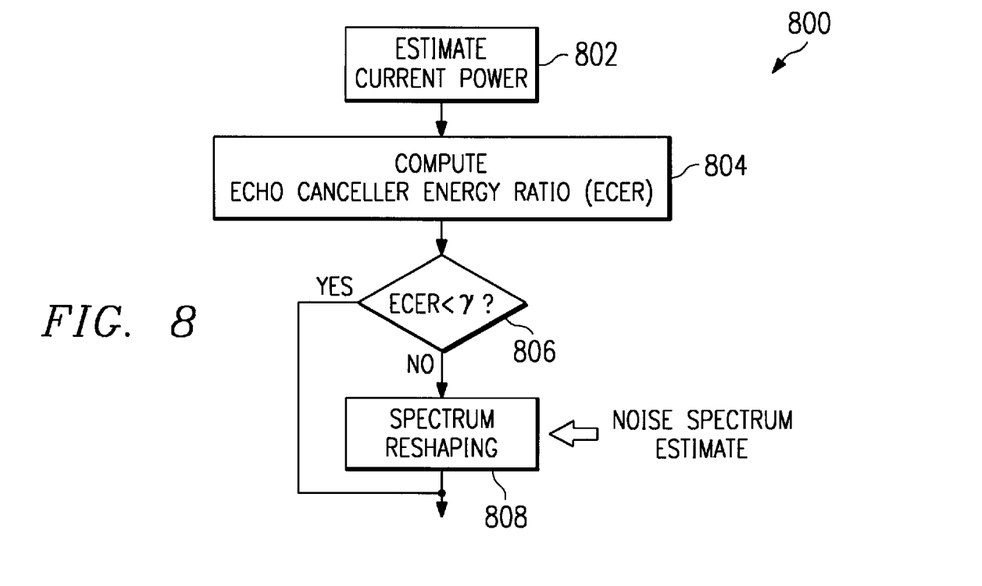
FIG. 8 is flow diagram of the event sequences of the residue echo suppression of the embodiment shown in FIG. 7.

Residual echo suppression circuit 750 implements the algorithm 800 shown in FIG. 8. The algorithm starts in block 802 in which the estimate of the current power is made. Control then passes to block 804 in which the echo canceller energy ratio (ECER) as shown in block 302 is computed. Control passes to block 806 in which it is determined whether or not ECER is less than an empirically determined constant γ. If it is, then the echo is determined to have been suppressed enough and no further action is taken. If it is not, control passes to block 808 in which a spectrum reshaping technique is applied. The spectrum reshaping technique utilizes the noise spectrum $NS_i$ described above. The purpose of the spectrum reshaping technique is to produce a comfort noise that closely matches the background noise characteristics. The spectrum reshaping technique reshapes the spectrum of the current signal, which contains the audible residual echo signal, based on the noise spectrum estimate. By reshaping the spectrum, the signal sounds similar to the background noise (background noise replaces the residual echo) which results in the clicking effects being almost removed.

Figure 9:
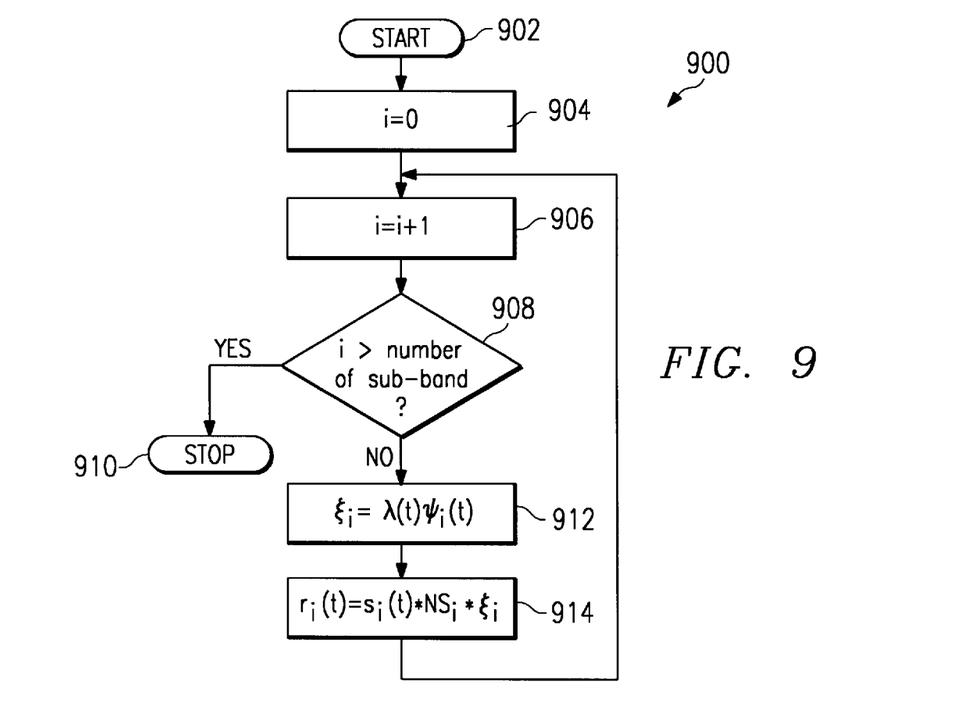
FIG. 9 is flow diagram of the event sequences of the spectrum reshaping shown in FIG. 8.

The spectrum reshaping technique shown in block 808 is implemented by the algorithm 900 shown in FIG. 9. Algorithm 900 starts at block 902 and transfers control to block 904 in which i is set equal to 0 where i represents the number of the frequency bin being processed. The value of i having been initialized, control passes to block 906 in which the value of i is implemented by 1 and control then passes to block 908 in which the decision is made as to whether i is greater than the number of the sub-band being utilized in processing; in the present embodiment 8 sub-bands are utilized. If i exceeds the number of sub-bands being processed, control then passes to block 910 where the algorithm stops. If i does not exceed the number of sub-bands being processed, control passes to block 912 in which the scaling value $\xi_i$ can be computed using the equation:

$$\xi_i = \lambda |s_i(t)|^2 \quad \text{(Equation 3)}$$

where λ is a constant. However, in a preferred embodiment of the invention, equation 3 is replaced with equation 4=

$$\xi_i = \lambda(t)\Psi_i(t) \quad \text{(Equation 4)}$$

where λ(t) is a time-varying constant. Equation 3 represents the scaling value $\xi_i$ based on the instantaneous power of $s_i(t)$, whereas equation 4 represents the scaling value $\xi_i$ based on the average power of $s_i(t)$, which gives a smoother response. In equation 4, $\Psi_i(t)$ is a long-term power estimate for the i-th bin, which can be computed as:

$$\Psi_i(t) = (1-\mu)\Psi_i(t-1) + \mu |s_i(t)|^2 \quad \text{(Equation 5)}$$

where as before $\mu << 1$.

The time-varying constant λ(t) can be estimated for each frame as:

$$\lambda(t) = \frac{1}{N}\frac{1}{M}\sum_{k=1}^{N}\sum_{j=1}^{M}|s_j(t-k)|^2$$

where M is the number of bins and N is the total number of data points in a frame. It is also possible to estimate λ(t) in a manner similar to equation 5 or to use a time-invariant constant λ which can be determined empirically.

Control then passes to block 914 in which the output signal $r_i(t)$ is computed by multiplying the signal on line 732 $s_i(t)$ by the noise spectrum estimate and the computed value of $\xi_i$ using equation 7:

$$r_i(t) = s_i(t) * NS_i * \xi_i \quad \text{(Equation 7)}$$

Control then passes back to block 906 and the process is repeated until the value of M exceeds the number of sub-bands being processed at which point the algorithm terminates at block 910.

Figure 10:
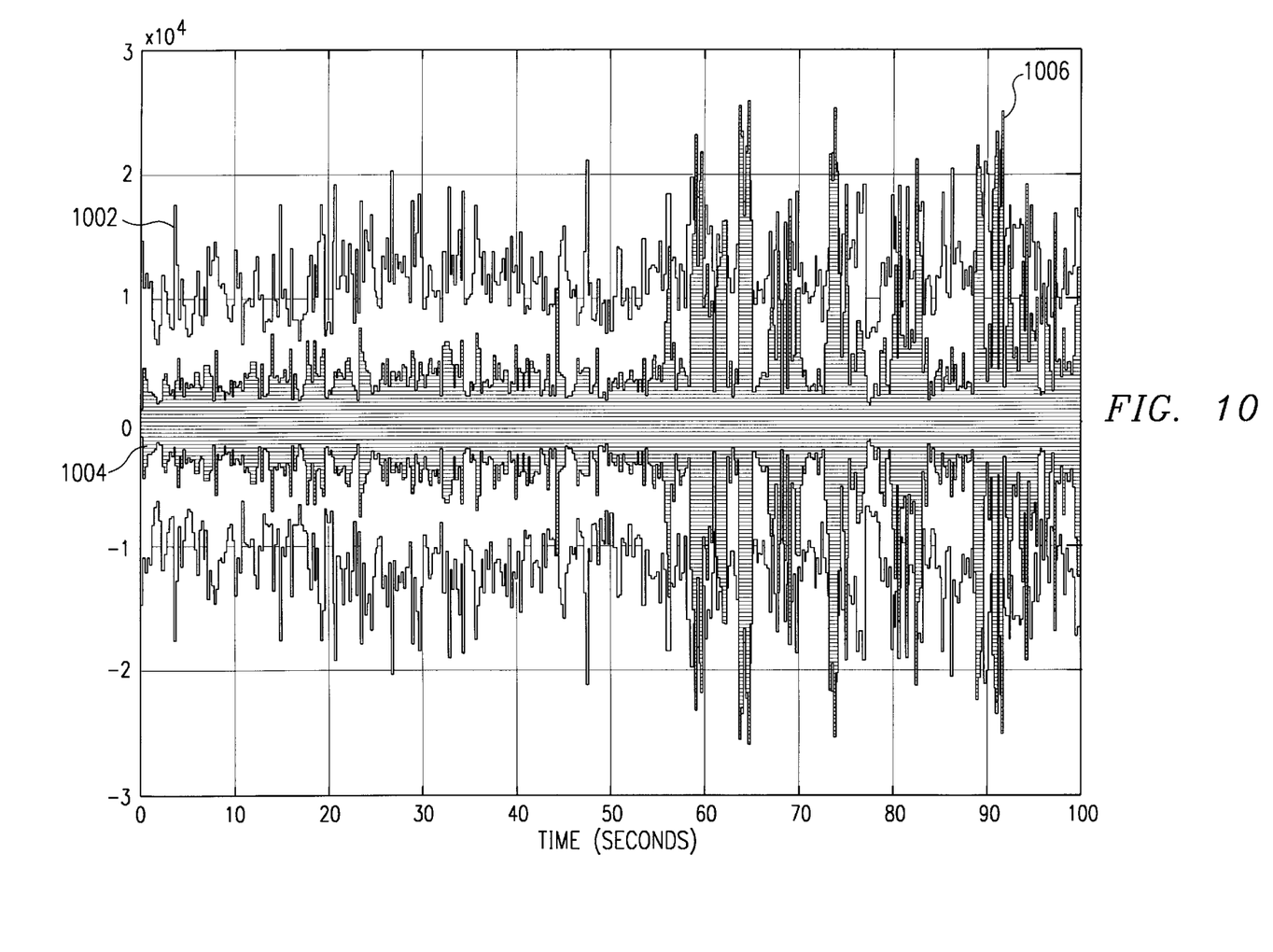
FIG. 10 shows the input and output signals of acoustic echo cancellation and noise suppression system in which residual echo suppression is not utilized.

FIGS. 10 and 11 illustrate the performance of the system. FIG. 10 shows the input from microphone 224 as signal 1002. For the first period of about 55 seconds, the signal contains the echo signal with highway noise while the remaining period indicates the presence of near-end speech. Signal 1004 shows the dramatic reduction in input noise. Signal 1006 represents the near-end speech. Residual echo suppression was not utilized in this test.

Figure 11A:
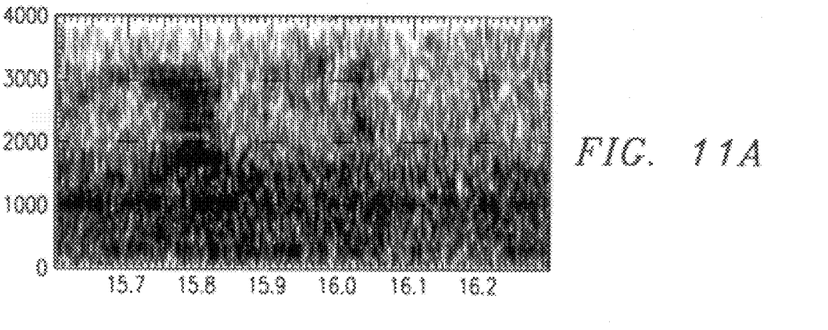
FIG. 11a shows the input signal to the acoustic echo and noise suppression system, y(t)
Figure 11B:
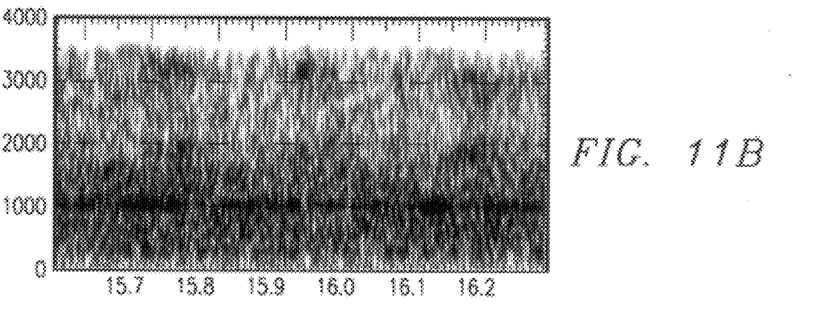
FIG. 11b illustrates the output of the echo cancellation e(t)

FIG. 11 depicts the spectrograms of four signals: the input signal of the acoustic echo cancellation and noise suppression system y(t) is shown in FIG. 11a. The output e(t) of the echo cancellation circuit only is shown in FIG. 11b. The signal $s_s(t)$ at the output of the noise suppression circuit is shown in FIG. 11c and the output $r_s(t)$ of the residual echo suppression using spectrum reshaping is shown in FIG. 11d. Note that the output of the residual echo suppression lacks an indication of the speech characteristics.

Figure 11C:
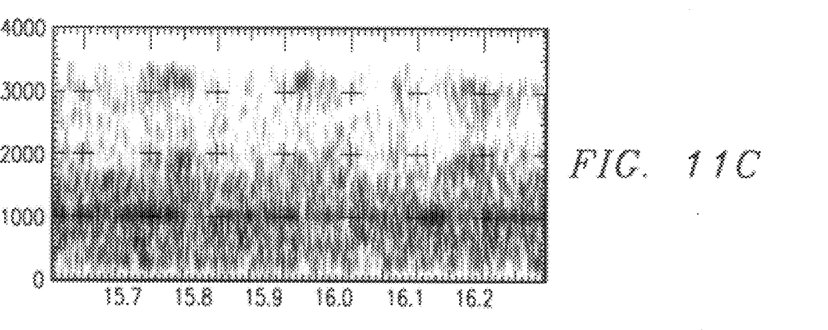
FIG. 11c illustrates the output of the noise suppression $s_i(t)$ and FIG. 11d illustrates the output $r_i(t)$ of the residual echo suppression using spectrum reshaping.
Figure 11D:
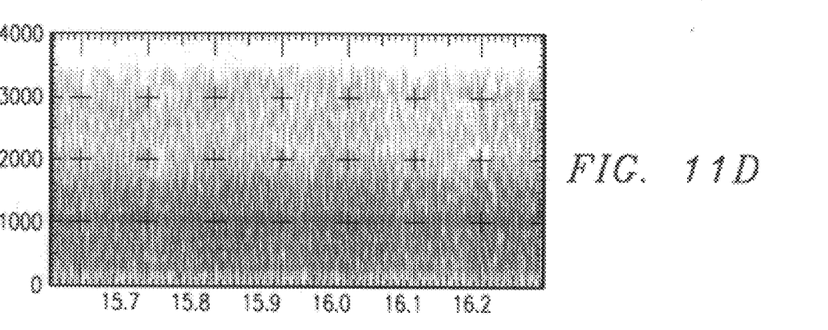

The signal $s_s(t)$ at the output of noise suppression circuit contains a residual echo signal seen between 2,000 and 3,000 Hz vertically and between 15.7 and 16.2 seconds horizontally in FIG. 11c. In FIG. 11d it can be seen that these residual echo signals are gone, replaced with a signal which appears as a background signal. Thus, the residual echo has been removed without introducing "switching effects".

It is estimated that utilizing a TMS 320C50 with the program implemented in assembly language that the acoustic echo cancellation program will require 6 MIPS of processing power, the noise suppression 1 MIP of processing power, and the residual echo suppression 1 MIP of processing power.

While a particular embodiment of the present invention has been disclosed herein, certain changes and modifications will readily occur to those skilled in the art. For example, although the residual suppression circuit was described in a sub-band domain system, it is not so limited. Any transformation to represent the frequency domain such as FFT, DFT, or Wavelet Transform can also be used. The circuitry necessary to perform such transformations and inverse transformations back to the frequency domain are well known in the art. All such changes and modifications can be made without departing from the invention as defined by the appended claims.

What is claimed is:

1. In a hands-free telephone comprising a loudspeaker coupled to an output source for generating an output signal, a microphone for generating an input signal and an acoustic echo cancellation means for generating a reduced-echo signal, a method for further reducing echo comprising the steps of:

determining an echo canceller energy ratio (ECER) as an energy ratio between an output of said acoustic echo cancellation means and said output source output signal;

comparing ECER to a predetermined threshold level;

performing spectrum reshaping of said reduced-echo signal if ECER exceeds said predetermined threshold level.

2. The method of claim 1 wherein said acoustic echo cancellation means and said spectrum reshaping step are in a sub-band domain.

3. The method of claim 1 wherein the spectrum reshaping step comprises the steps of generating an output of a noise suppression circuit in said acoustic echo cancellation means;

computing an output signal $r_i(t)$ as $$r_i(t)=s_i(t)*NS_i*\xi_i$$

where $s_i(t)$ is the output of the noise suppression circuit, $NS_i$ is the noise spectrum estimate and $\xi_i$ represents the scaling value based on the long term average power of the $s_i(t)$.

4. The method of claim 3 wherein $$\xi_i = \frac{\lambda}{|s_i(t)|^2}$$

where $\lambda$ is a constant.

5. The method of claim 4 wherein $\lambda$ is a time-invariant constant determined empirically.

6. The method of claim 4 wherein $$\lambda = \lambda(t) = \frac{1}{N}\frac{1}{M}\sum_{k=1}^{N}\sum_{j=1}^{M}|s_j(t-k)|^2$$

where M is the number of bins and N is the total number of data points in a frame.

7. The method of claim 3 wherein $$\xi_i = \frac{\lambda(t)}{\psi_i(t)}$$

where $\lambda(t)$ is a time-varying constant and $\Psi_i(t)$ is a long-term power estimate for the i-th bin.

8. The method of claim 7 wherein $$\lambda = \lambda(t) = \frac{1}{N}\frac{1}{M}\sum_{k=1}^{N}\sum_{j=1}^{M}|s_j(t-k)|^2$$

where M is the number of bins and N is the total number of data points in a frame.

9. The method of claim 7 wherein $$\Psi_i(t)=(1-\mu)\Psi_i(t-1)+\mu|s_i(t)|^2$$

where $\mu<<1$.

10. The method of claim 9 wherein $$\lambda = \lambda(t) = \frac{1}{N}\frac{1}{M}\sum_{k=1}^{N}\sum_{j=1}^{M}|s_j(t-k)|^2$$

where M is the number of bins and N is the total number of data points in a frame.

11. In a hands-free telephone comprising a loudspeaker coupled to an output source for generating an output signal, a microphone for generating an input signal and an acoustic echo cancellation means for generating a reduced-echo signal, apparatus for further reducing echo comprising:

means for determining an echo canceller energy ratio (ECER) as an energy ratio between an output of said acoustic echo cancellation means and said output source output signal;

means for comparing ECER to a predetermined threshold level;

means for performing spectrum reshaping of said reduced-echo signal if ECER exceeds said predetermined threshold level.

12. The apparatus of claim 11 wherein said acoustic echo cancellation means and said spectrum reshaping means operate in a sub-band domain.

13. The apparatus of claim 11 wherein the acoustic echo cancellation means comprises a noise suppression circuit; and the spectrum reshaping means comprises:

means for computing an output signal $r_i(t)$ as $$r_i(t)=s_i(t)*NS_i*\xi_i$$

where $s_i(t)$ is the output of the noise suppression circuit, $NS_i$ is the noise spectrum estimate and $\xi_i$ represents the scaling value based on the long term average power of the $s_i(t)$.

14. The apparatus of claim 13 wherein $$\xi_i = \frac{\lambda}{|s_i(t)|^2}$$

where $\lambda$ is a constant.

15. The apparatus of claim 14 wherein $\lambda$ is a time-invariant constant determined empirically.

16. The apparatus of claim 14 wherein $$\lambda = \lambda(t) = \frac{1}{N}\frac{1}{M}\sum_{k=1}^{N}\sum_{j=1}^{M}|s_j(t-k)|^2$$

where M is the number of bins and N is the total number of data points in a frame.

17. The apparatus of claim 13 wherein $$\xi_i = \frac{\lambda(t)}{\psi_i(t)}$$

where $\lambda(t)$ is a time-varying constant and $\Psi_i(t)$ is a long-term power estimate for the i-th bin.

18. The apparatus of claim 17 wherein $$\lambda(t) = \frac{1}{N}\frac{1}{M}\sum_{k=1}^{N}\sum_{j=1}^{M}|s_j(t-k)|^2$$

where M is the number of bins and N is the total number of data points in a frame.

19. The apparatus of claim 17 wherein $$\Psi_i(t)=(1-\mu)\Psi_i(t-1)+\mu|s_i(t)|^2$$

where $\mu<<1$.

20. The apparatus of claim 19 wherein $$\lambda(t) = \frac{1}{N}\frac{1}{M}\sum_{k=1}^{N}\sum_{j=1}^{M}|s_j(t-k)|^2$$

where M is the number of bins and N is the total number of data points in a frame.

21. In a hands-free telephone comprising a loudspeaker coupled to an output source for generating an output signal, a microphone for generating an input signal and a sub-band acoustic echo cancellation means for generating a reduced-echo signal, a method for further reducing echo comprising the steps of:

determining an echo canceller energy ratio (ECER) as an energy ratio between an output of said acoustic echo cancellation means and said output source output signal;

comparing ECER to a predetermined threshold level;

performing sub-band spectrum reshaping if said reduced-echo signal of ECER exceeds said predetermined threshold level, said reshaping step comprising the steps of:

providing a noise suppression circuit in the acoustic echo cancellation means;

computing an output signal $r_i(t)$ as $$r_i(t) = s_i(t)*NS_i*\frac{\lambda(t)}{\psi_i(t)}$$

where $s_i(t)$ is the output of the noise suppression circuit, $NS_i$ is the noise spectrum estimate, $$\lambda(t) = \frac{1}{N}\frac{1}{M}\sum_{k=1}^{N}\sum_{j=1}^{M}|s_j(t-k)|^2$$

where M is the number of bins and N is the total number of data points in a frame; and $$\Psi_i(t)=(1-\mu)\Psi_i(t-1)+\mu|s_i(t)|^2$$

where $\mu<<1$.

* * * * *